Dec. 21, 1943.  A. L. DAVIS  2,337,034
HEAT TREATING VEGETABLE MATERIAL
Filed June 20, 1940  4 Sheets-Sheet 4

Arthur L. Davis
INVENTOR

Patented Dec. 21, 1943

2,337,034

UNITED STATES PATENT OFFICE 2,337,034

HEAT TREATING VEGETABLE MATERIAL

Arthur L. Davis, near Knoxville, Tenn.

Application June 20, 1940, Serial No. 341,537

5 Claims. (Cl. 99—1)

(Granted under the act of March 3, 1883, as amended April 30, 1928; 370 O. G. 757)

This invention relates to a process for the rapid heat treatment of animal or vegetable material, particularly for the preparation of such material for use as a foodstuff or for the subsequent separation of components or constituents thereof.

One of the objects of this invention is to provide a process for the rapid heat treatment of material of animal or vegetable origin for its conversion into intermediate or finished products. Another object of this invention is to provide a process for rapid heat treatment of animal or vegetable material in which the material is subjected to the action of heat under conditions such that the product obtained is not overtreated. Still another object of this invention is to provide a process for the rapid heat treatment of animal or vegetable material in which the extent to which the heat treatment takes place is definitely controlled. A further object of this invention is to provide a process for the rapid heat treatment of animal or vegetable material at a predetermined maximum temperature for a predetermined length of time. Other objects of this invention include the provision of a process for the rapid heat treatment of such materials at a predetermined rate of temperature change within the material for a predetermined time.

I have discovered a process for the rapid heat treatment of animal or vegetable material in the preparation of said material for use as a foodstuff or the subsequent separation of components or constituents thereof which comprises subjecting said material to a controlled heating and cooling cycle of predetermined time and temperatures for a predetermined degree of such heat treatment such that the integrated heating action above the temperature at which substantial effect of such heat treatment begins is equivalent to heating said material for approximately one second at 190° C. for complete heat treatment of said material without appreciable overtreatment or undertreatment.

The rapid heat treatment of animal or vegetable material necessarily involves a rapid heat transfer therethrough during the period of rising temperature above that temperature at which any substantial effect of the heat treatment occurs, during a period of heat treatment at a maximum substantially constant temperature, if in fact such a temperature is maintained, and during the period of cooling to a temperature below which any substantial effect of the heat treatment occurs. The conditions for heat treatment may be such that the entire operation is completed during the period of rising temperature and the period of cooling with the elimination of the necessity of obtaining the material at a maximum substantially constant temperature.

The heat treatment of animal or vegetable material, as employed in the prior art, generally contemplates a time-temperature cycle of treatment in which there is no correlation of the effect of temperature or time on the material being treated, there is no method provided for obtaining a predetermined critical point for material being treated, that is, the point at which said material is substantially completely heat treated without being overtreated or undertreated, and there is no method for determining the extent to which the material which has been heat treated has been effected, that is, whether or not such critical point has been reached or exceeded.

The present invention is based upon the concept that a small uniform-sized particle of animal or vegetable material, say 1 mm. cube to be substantially completely heat treated without appreciable carbonization, must be heat treated rapidly under conditions which produce an effect equivalent to raising the temperature of such material above the temperature at which it is appreciably affected by such treatment to a temperature of substantially 190° C. in an infinitely short period of time, maintaining the temperature of 190° C. for one second, and thereafter cooling the heat treated material from 190° C. to below said temperature at which the material is appreciably affected by the heat treatment in an infinitely short period of time. Likewise, the same effect may be obtained by heat treating such material at a maximum heating temperature below 190° C.

Although the fundamental variables in any process for heat treatment are temperature and time, such variables may not be ordinarily expressed for practical utilization without taking into account (1) rate of temperature change during the treating cycle, (2) the maximum temperature attained during the treating cycle, (3) the time the material is maintained at such maximum heating temperature during the treating cycle and (4) extent to which such heat treatment is to affect the material treated in such a cycle, that is, whether or not the material has been completely treated or is undertreated or overtreated. Such interrelated factors can only be expressed with sufficient accuracy for use by those skilled in the art by mathematical expression. The development of the forms of expression used is included in order that the hitherto unknown and unrecognized relationships which exist may be clearly and precisely set forth.

The general mathematical relationship involved at a constant temperature $\theta_h$ in degrees C. may be expressed by Equations 1, 2, 3, and 4

(1) $$x = C_\theta \phi(t)$$

where $x$ is the fraction of the material affected by the heat treatment, $C_\theta$ is a proportionality constant independent of time, and $\phi(t)$ is a functional relationship of time in seconds between the temperature and the time which may be determined experimentally.

(2) $$C_\theta = \psi\left(n^{\frac{\theta_h - \theta_o}{10}}\right)$$

where $\psi$ is a functional relationship of temperature in degrees C., $n$ is the number of times that the rate of reaction increases for each 10° C. rise in temperature, $\theta_h$ is a constant treating temperature in degrees C., and $\theta_o$ is the temperature in degrees C., at which any substantial effect of heat treatment begins or ends.

(3) $$\theta = f(t)$$

or (4) $$t = f^{-1}(\theta)$$

where $f(t)$ is a functional relationship of time in seconds between the temperature and the time, and $f^{-1}(\theta)$ is a functional relationship of temperature in degrees C. between the temperature and the time.

Considering the process as generally and practically involving three discontinuous sections of a temperature v. time curve, namely, the rising temperature period, the constant temperature period, and the cooling period, then (5) $$T = t_r + t_h + t_c$$

where $T$ is the total time of heat treatment in seconds, $t_r$ is the time in seconds during the rising temperature period, $t_h$ is the time in seconds during the constant or substantially constant temperature period, and $t_c$ is the time in seconds during the cooling period.

Considering the primary variables to be $\theta_h$ and $t_h$, the total time of heat treatment may be expressed as a function of these variables as follows (6) $$T = f_r^{-1}(\theta_h) + t_h + f_c^{-1}(\theta_h)$$

where $f_r^{-1}$ is the functional relationship between the temperature and time during the period of rising temperature, and $f_c^{-1}$ is the functional relationship between the temperature and time during the cooling period.

The fraction of the material affected by heat treatment during the period of changing temperature must be expressed in the form of an integral as follows (7) $$x = \int_0^x dx$$

Differentiating Equation 1 to obtain $dx$ as a function of $C_\theta$ and substituting in Equation 7

(8) $$x = \int_0^x C_\theta \frac{d\phi(t)}{dt} dt$$

Substituting the value of $C\theta$ and applying specifically to the rising temperature period and the cooling period (9) $$x_r = \int_0^{t_r} \psi\left(n^{\frac{\theta_h - \theta_o}{10}}\right) \frac{d\phi(t)}{dt} dt$$

(10) $$x_c = \int_0^{t_c} \psi\left(n^{\frac{\theta_h - \theta_o}{10}}\right) \frac{d\phi(t)}{dt} dt$$

where $x_r$ is the fraction affected during the rising temperature period, and $x_c$ is the fraction affected during the cooling period.

Taking the criterion that the total fraction affected is the sum of the fractions affected during the three respective treating periods, then

(11) $$X = x_r + x_h + x_c$$

where $X$ is the total fraction affected, and $x_h$ is the fraction affected during the substantially constant temperature period.

Substituting Equation 2 in Equation 1 and applying to the substantially constant temperature period

(12) $$x_h = \psi\left(n^{\frac{\theta_h - \theta_o}{10}}\right) \phi(t_h)$$

Substituting Equations 9, 10 and 12 in Equation 11

(13) $$X = \int_0^{t_r} \psi\left(n^{\frac{\theta_h - \theta_o}{10}}\right) \frac{d\phi(t)}{dt} dt + \psi\left(n^{\frac{\theta_h - \theta_o}{10}}\right) \phi(t_h) + \int_0^{t_c} \psi\left(n^{\frac{\theta_h - \theta_o}{10}}\right) \frac{d\phi(t)}{dt} dt$$

Substituting Equation 4 in Equation 13 and appropriately changing the limits of the integrals from $t$ to $\theta$

(14) $$X = \int_{\theta_o}^{f_r^{-1}(\theta_h)} \psi\left(n^{\frac{\theta_h - \theta_o}{10}}\right) \frac{d\phi(f_r^{-1}(\theta))}{dt} df_r^{-1}(\theta) + \psi\left(n^{\frac{\theta_h - \theta_o}{10}}\right) \phi(t_h) + \int_{\theta_o}^{f_c^{-1}(\theta_h)} \psi\left(n^{\frac{\theta_h - \theta_o}{10}}\right) \frac{d\phi(f_c^{-1}(\theta))}{dt} df_c^{-1}(\theta)$$

Since the forms of the functions $f_r^{-1}$, $\psi$, $n$ (if a variable), $\phi$ and $f_c^{-1}$ are known, the Equation 14 involves only $\theta$ and $t$, one of which may be found in terms of the other.

Since all of the functions in the general equation may not be known for every specific heat treating operation, that some one function, such as $n$, may have to be determined experimentally, the following set of conditions are now used in specific examples:

a. Substantial effect of heat treatment begins or ends at substantially 100° C., b. Rate of reaction trebles for each 10° C. temperature rise, c. Heat treatment is complete at 190° C. in one second, assuming a small uniform size particle of material, say a 1 mm. cube, and d. Substantially complete heat treatment and fraction affected is proportional to time.

Expressed mathematically these bases become

(15) $$x = Kt \text{ (} x \text{ not to exceed 1)}$$

where $K$ is a constant at constant temperature and is defined at any temperature $\theta$ as

(16) $$K_\theta = K_{190} \frac{1}{3^{\frac{190 - \theta}{10}}}$$

which is equivalent to $C_\theta$ in Equation 2 since 190° C. is used as the base temperature.

From Equations 15 and 16 and condition $d$ above

(17) $$K_{190} = 1$$

The simplest consideration is that the temperature is raised or lowered at a linear rate.

(18) $$\theta = \theta_o + Rt, \text{ or } t = \frac{\theta - \theta_o}{R}$$

where $R$ is the mean rate of temperature rise or fall in degrees C. per second.

Since $\phi(t) = T$, Equation 8 becomes

(19) $$x = \int_0^t \frac{1}{3^{\frac{190-\theta_h}{10}}} dt$$

Substituting $$t = \frac{\theta - \theta_o}{R}$$

in Equation 19

(20) $$x_r = \int_{\theta_o}^{\theta_h} \frac{1}{3^{\frac{190-\theta_h}{10}}} \cdot \frac{1}{R_r} d\theta$$

and

(21) $$x_c = \int_{\theta_o}^{\theta_h} \frac{1}{3^{\frac{190-\theta_h}{10}}} \cdot \frac{1}{R_c} d\theta$$

Substituting the proper functional forms in Equations 11 and 12

(22) $$x_h = \frac{1}{3^{\frac{190-\theta_h}{10}}} \cdot t_h$$

or

(23) $$t_h = x_h \cdot 3^{\frac{190-\theta_h}{10}}$$

Since $T = t_r + t_h + t_c$, from Equation 5, the total heat treating time, $T$, may be calculated by the substitution of the equations

(24) $$t_r = \frac{\theta_h - \theta_o}{R_r}$$

(25) $$t_h = 3^{\frac{190-\theta_h}{10}} (X - x_r - x_c)$$

(26) $$t_c = \frac{\theta_h - \theta_o}{R_c}$$

and Equations 20 and 21.

When in the course of the heat treatment the temperature of the material being heated is raised to the maximum temperature, $\theta_h$, is maintained at said maximum temperature and thereafter cooled, the total fraction treated according to Equation 11 is represented by

(27) $$X = \int_{\theta_o}^{\theta_h} \frac{1}{3^{\frac{190-\theta_h}{10}}} \cdot \frac{1}{R_r} d\theta + \frac{1}{3^{\frac{190-\theta_h}{10}}} t_h + \int_{\theta_o}^{\theta_h} \frac{1}{3^{\frac{190-\theta_h}{10}}} \cdot \frac{1}{R_c} d\theta$$

Integrating, dropping the lower limit, when $\theta - \theta_o$, which is negligible, and simplifying

(28) $$X = \frac{9.10241}{3^{\frac{190-\theta_h}{10}}} \left( \frac{1}{R_r} + \frac{t_h}{9.10241} + \frac{1}{R_c} \right)$$

Likewise

(29) $$\theta_h = 190 - \left[ 9.10241 \cdot \log_e \left( \frac{1}{X} \left( \frac{9.10241}{R_r} + t_h + \frac{9.10241}{R_c} \right) \right) \right]$$

(30) $$t_h = X \left( 3^{\frac{190-\theta_h}{10}} \right) - \left( \frac{9.10241}{R_r} + \frac{9.10241}{R_c} \right)$$

(31) $$R_r = \frac{1}{X \left( \frac{3^{\frac{190-\theta_h}{10}}}{9.10241} \right) - \frac{t_h}{9.10241} - \frac{1}{R_c}}$$

(32) $$R_c = \frac{1}{X \left( \frac{3^{\frac{190-\theta_h}{10}}}{9.10241} \right) - \frac{t_h}{9.10241} - \frac{1}{R_r}}$$

When in the course of the heat treatment, the temperature of the material being treated is raised to the maximum heating temperature, $\theta_h$, and is not maintained at said maximum temperature but is thereafter cooled, then $t_h = 0$ and

(33) $$X = \frac{9.10241}{3^{\frac{190-\theta_h}{10}}} \left( \frac{1}{R_r} + \frac{1}{R_c} \right)$$

(34) $$\theta_h = 190 - \left[ 9.10241 \cdot \log_e \left( \frac{1}{X} \left( \frac{9.10241}{R_r} + \frac{9.10241}{R_c} \right) \right) \right]$$

(35) $$R_r = \frac{1}{X \left( \frac{3^{\frac{190-\theta_h}{10}}}{9.10241} \right) - \frac{1}{R_c}}$$

(36) $$R_c = \frac{1}{X \left( \frac{3^{\frac{190-\theta_h}{10}}}{9.10241} \right) - \frac{1}{R_r}}$$

When in the course of the heat treatment, the temperature of the material being treated is raised to the maximum temperature, $\theta_h$, is maintained at said maximum temperature, and thereafter cooled at a rate of temperature change substantially equal to the rate of temperature change during the rising temperature period, then $R_r = R_c$, and

(37) $$X = \frac{1}{3^{\frac{190-\theta_h}{10}}} \left( \frac{18.2042}{R} + t_h \right)$$

(38) $$\theta_h = 190 - \left[ 9.10241 \cdot \log_e \left( \frac{1}{X} \left( \frac{18.20482}{R} + t_h \right) \right) \right]$$

(39) $$t_h = X \left( 3^{\frac{190-\theta_h}{10}} \right) - \frac{18.20482}{R}$$

(40) $$R = \frac{18.20482}{X \left( 3^{\frac{190-\theta_h}{10}} \right) - t_h}$$

When in the course of the heat treatment, the temperature of the material is raised to the maximum treating temperature, $\theta_h$, is not maintained at said maximum temperature, but is thereafter cooled at a rate of temperature change substantially equal to the rate of temperature change during the rising temperature period, then $t_h = 0$, $R_r = R_c$, and

(41) $$X = \frac{18.20482}{R \left( 3^{\frac{190-\theta_h}{10}} \right)}$$

(42) $$\theta_h = 190 - \left[ 9.10241 \cdot \log_e \left( \frac{18.20482}{X \cdot R} \right) \right]$$

(43) $$R = \frac{18.20482}{X \left( 3^{\frac{190-\theta_h}{10}} \right)}$$

The time for substantially complete heat treatment at any one temperature, $\theta_h$, may be obtained for Equation 23 using $x_h = 1$. Then

(44) $$t_h = 3^{\frac{190-\theta_h}{10}}$$

where $t_h$ is the equivalent time in seconds at the maximum heating temperature, $\theta_h$, for substantially complete heat treatment.

With the time for substantially complete heat treatment at any one temperature known, the equivalent at that temperature for temperature increment during both the rising temperature period and the cooling period may be approximated from

(45) $$t_h = \frac{t_i}{3^{\frac{\theta_h-\theta_i}{10}}}$$

where
$\theta$ is the mean temperature in degrees C. for each temperature increment,
$t_i$ is the actual time in seconds for each temperature increment with a mean temperature, $\theta_i$, and
$t_h$ is the equivalent time in seconds at the maximum heating temperature, $\theta_h$, for each temperature increment with a mean temperature, $\theta_i$.

As before, when the material being heated is merely raised to the temperature, $\theta_h$, and is not maintained at substantially that temperature, then $\theta_h$ is only the maximum temperature reached. Then $t_h$ is the equivalent time for substantially complete heat treatment at the maximum temperature, and such heat treatment must be completed during the rising temperature period and period of cooling which may still be approximated according to Equation 45.

The present invention also contemplates the provision of a method for determination with regard to time and temperature when an animal or vegetable material under uniform heat treatment approaches, coincides or passes beyond the critical point of total conversion of the material being treated.

Broadly, this procedure is effected by observing successive intervals of time relating to or dependent upon simultaneous temperatures of said material and obtaining a cumulative result relative to said critical point according to a relationship, heretofore expressed, wherein complete heat treatment occurs in one second at 190° C. and the rate of heat treatment trebles for each 10° C. rise in temperature above 100° C.

The effect of the integrated heating action may be approximated for many practical uses by making a summation of extent of heat treatment during successive short intervals of time throughout the entire period of treatment substantially according to the equation

(46) $$x = \frac{t_\theta}{3^{\frac{190-\theta}{10}}}$$

Likewise the effect of the integrated heating action may be approximated for most practical purposes by the determination of the value for X, the total fraction effected, in accordance with Equation 28 above.

The time for substantially complete heat treatment, at any one temperature, according to Equation 44 is shown in Table 1.

TABLE 1.—*Relationship between temperature and time for substantially complete heat treatment*

| Temperature, $\theta_h$, in °C. | Time, $t_h$ | | |
|---|---|---|---|
| | Seconds | Minutes | Hours |
| 190 | 1 | | |
| 180 | 3 | | |
| 170 | 9 | | |
| 160 | 27 | | |
| 150 | 81 | 1.3 | |
| 140 | 243 | 4.0 | |
| 130 | 729 | 12.1 | |
| 120 | 2,187 | 36.4 | |
| 110 | 6,561 | 109.3 | 1.8 |
| 100 | 19,683 | 328.0 | 5.4 |

Fig. 1 is a graph presenting the relationship between temperature and time for substantially complete heat treatment at any one temperature and in accordance with the values shown in Table 1 above wherein curves 1, 2, and 3 represent such relationship with the time shown in seconds, minutes, and hours, respectively.

Taking the mean rate of temperature change during the rising temperature period to the maximum heating temperature and the mean rate of temperature change during the cooling period to be the same, the time required during the respective periods of heat treatment, the total time required for substantially complete treatment and the rate of temperature change, for maximum heating temperatures of 140° to 180° C. inclusive are shown in Table 2.

TABLE 2.—*Relationship between temperature and time for substantially complete heat treatment for various rates of temperature change*

| Temperature $\theta_h$, in °C. | Time in seconds | | | | Total time in minutes, T | Rate, R, in °C./sec. |
|---|---|---|---|---|---|---|
| | $t_r$ | $t_h$ | $t_c$ | $t$ | | |
| 180 | 13.4 | 0 | 13.4 | 26.8 | 0.45 | 6.03 |
| 170 | 11.7 | 6.0 | 11.7 | 29.4 | 0.49 | 6.03 |
| 170 | 35.0 | 0 | 35.0 | 70.0 | 1.17 | 2.00 |
| 160 | 30.0 | 18.0 | 30.0 | 78.0 | 1.30 | 2.00 |
| 160 | 90.0 | 0 | 90.0 | 180.0 | 3.00 | 0.67 |
| 150 | 74.5 | 54.0 | 74.5 | 203.0 | 3.39 | 0.67 |
| 150 | 225.0 | 0 | 225.0 | 450.0 | 7.50 | 0.22 |
| 140 | 182.0 | 160.0 | 182.0 | 524.0 | 8.73 | 0.22 |
| 140 | 540.0 | | | | | 0.07 |

Fig. 2 is a graph presenting the relationship between temperature and time for substantially complete heat treatment of material, the rate of temperature change during the rising temperature, and the cooling temperature period equal and in accordance with the values shown in Table 2 above wherein curves 4 and 5 show a temperature change of 6.03° C. per second, curves 6 and 7 show a temperature change of 2.00° C. per second, curves 8 and 9 show a temperature change of 0.67° C. per second, curves 10 and 11 show a temperature change of 0.22° C. per second, and curves 12 and 13 show a temperature change of 0.07° C. per second, with the maximum heating temperatures for the successive curves shown plotted against times in minutes.

One example for the operation of the process of the present invention is given for the discontinuous high speed heat treatment for prime cottonseed in preparing the same for the extraction of oil therefrom. A charge of 325 pounds of prime cottonseed, hulled and rolled to a thickness of 0.009 inch, was placed in a steam jacketed, fluid imperviously sealed autoclave, said apparatus being provided with means for maintaining a charge at a substantially uniform temperature throughout, means for admission of steam into direct contact with said charge and means for maintaining a predetermined pressure within said autoclave. The charge within the autoclave was heated from 212° F. to 284° F. in approximately 8 minutes (7.92 minutes) and maintained at a temperature of 284° F. for approximately 1 minute (0.96 minute) with an internal pressure within the autoclave ranging from 0 pound gage when the material was charged to a controlled pressure of approximately 28 pounds gage which was maintained during the period the charge was at 284° F. At the end of this period the pressure within the autoclave was immediately reduced to substantially atmospheric and the material so heat treated was cooled from 284° F. to 239° F. in approximately 4 minutes (4.12 minutes). Taking into account the rate of temperature rise, the time of the maximum heating temperature, and the rate of temperature change during the cooling period, the charge was so treated as to obtain substantially complete heat treatment of the material.

A second example for the operation of the process of the present invention is given wherein the material was treated in the same manner as in the first example except that the rates of temperature change and time at maximum temperature were varied to obtain a product which was not fully heat treated.

A third example for the operation of the process of the present invention is given wherein the material was treated in the same manner as in the first example except that the rates of temperature change and time at maximum temperature were varied to obtain a product which was substantially overtreated.

The time for which the material was maintained within the respective temperature ranges in the foregoing examples is shown in Table 3.

TABLE 3.—*Relationship between temperature and time for substantially complete heat treatment, for undertreatment and for overtreatment*

| Temperature range | First example, complete treatment run #19 | Second example, undertreatment run #37 | Third example, overtreatment run #21 |
| --- | --- | --- | --- |
| | Minutes | Minutes | Minutes |
| 100–110° C | 1.9 | 1.0 | 1.5 |
| 110–120° C | 1.2 | 1.4 | 0.6 |
| 120–130° C | 1.0 | 0.6 | 0.7 |
| 130–140° C | 3.8 | 2.8 | 2.2 |
| 140° C | 1.0 | 1.1 | 2.8 |
| 140–130° C | 0.4 | 0.4 | 0.4 |
| 130–120° C | 0.3 | 0.2 | 0.3 |
| 120–115° C | 3.4 | 1.5 | 2.5 |
| 115–110° C | 2.0 | 2.0 | 2.0 |
| | 15.0 | 11.0 | 13.0 |

Fig. 3 is a graph presenting the relationship between temperature and time in accordance with values included in Table 3 and the degree of treatment wherein curve 14 represents the conditions for the treatment of the material to obtain substantially complete heat treatment to a predetermined critical point expressed as 100% for the specific processing of cottonseed; curve 15 represents the condition for the treatment of the same material in order that it is undertreated; and curve 16 represents the conditions for the treatment of material in order that the material is overtreated.

The curves in Fig. 3 show how total time relative to the maximum heating temperature may be varied for different degrees of heat treatment. More specifically, although curve 16 represents heat treatment to the extent of 117% it is readily seen that the total time for heat treatment is 13 minutes as compared to the total time for heat treatment of curve 14 which is 15 minutes and represents 100%. Also it is readily seen that although the time at the maximum heating temperature for curves 14 and 15 is approximately one minute, the former is heat treated to 100%, while the latter is heat treated to only 84%, the total times being 15 minutes and 11 minutes respectively. These curves show the latitude of the present invention and its adaptability to conditions emanating from apparatus limitations, such as rate of heat variation and maximum temperature as well as a time cycle to fit into a unified plant operation.

Figure 5:
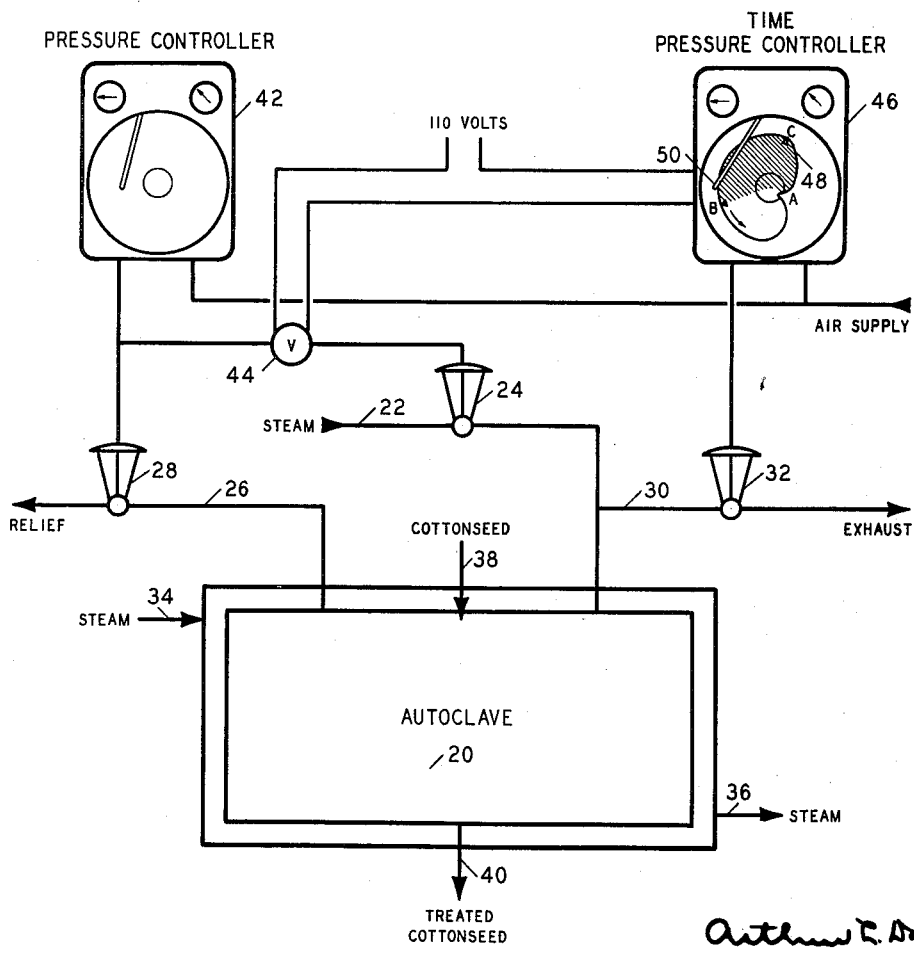
Fig. 5 is a diagrammatic illustration of one form of coordinated control apparatus for carrying out the process of the present invention.

In Fig. 5 the autoclave 20 is provided with a steam inlet line 22 which has a throttling valve 24, a relief line 26 which has a throttling valve 28, and an exhaust line 30 which has a throttling valve 32. The autoclave 20 is further provided with a steam inlet line 34 and a steam outlet line 36 for superficial heating as well as conventional means for ingress and egress of the material being treated as represented by lines 38 and 40 respectively.

A recording controller 42 is set to control at some definite pressure which in the instant case is 30 lbs. When the pressure within the autoclave 20 is exactly 30 lbs., the controller 42 will control valves 24 and 28 so that they will both be closed. If the pressure within the autoclave 20 drops below 30 lbs., the controller 42 will apply a greater air pressure to the valves so that the steam valve 24 will open sufficiently to maintain the desired 30 lbs. As the pressure within the cooker rises above 30 lbs., the controller 42 will reduce the air pressure on the valves 24 and 28 and the relief valve 28 will open to relieve the pressure within the autoclave 20. This control maintains the pressure within the autoclave to plus or minus 0.2 lb.

A 3-way electric air valve 44 is operated from a relay (not shown) operatively associated with a time-pressure controller 46. When the relay is closed, the valve 44 is energized thereby connecting the steam valve 24 to the controller 42. When the relay is opened, the valve 44 is de-energized, thereby disconnecting the steam valve 24 from the controller 42 and also causing steam valve 24 to close.

The time-pressure controller 46 controls the rate of exhaust from the autoclave 20 and also times the heat treating cycle substantially throughout. This is better understood by referring to cam 48 which is rotated by a synchronous motor and which has a period slightly greater than the time required for a complete heat treatment cycle. The cam 48 is cut substantially as is shown with one complete revolution of the cam equal to 15 minutes.

Figure 1:
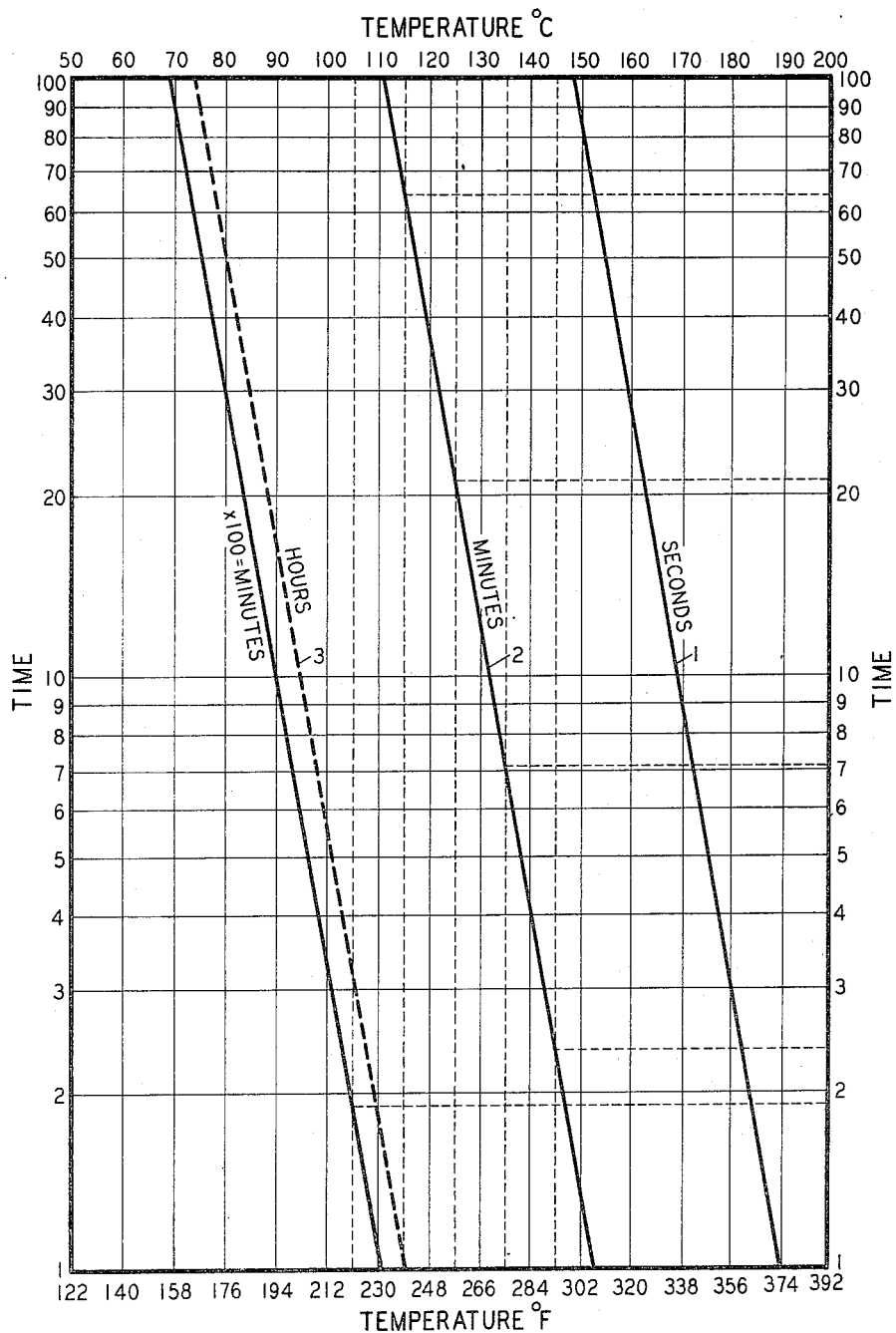
Figure 2:
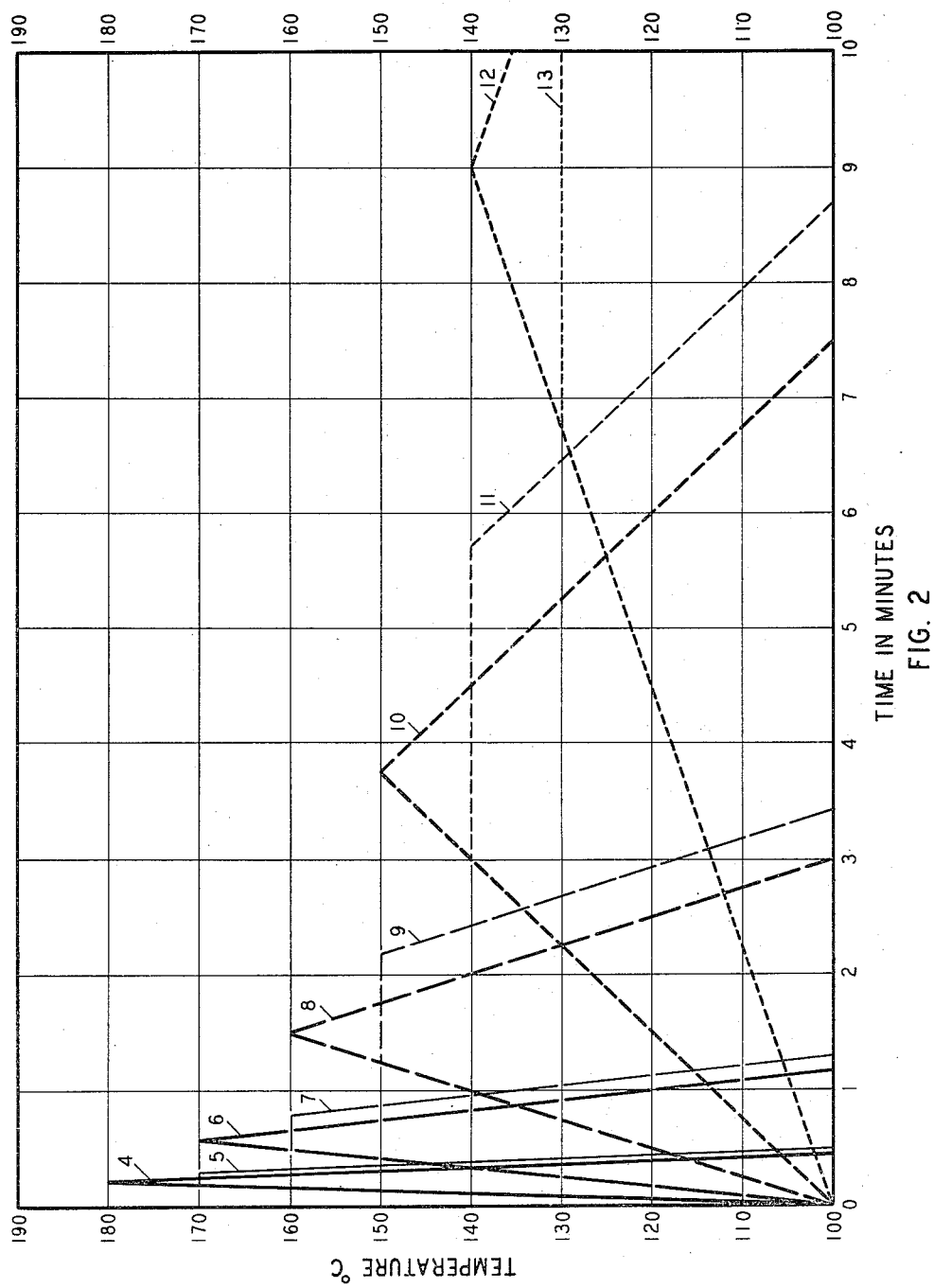
Figure 3:
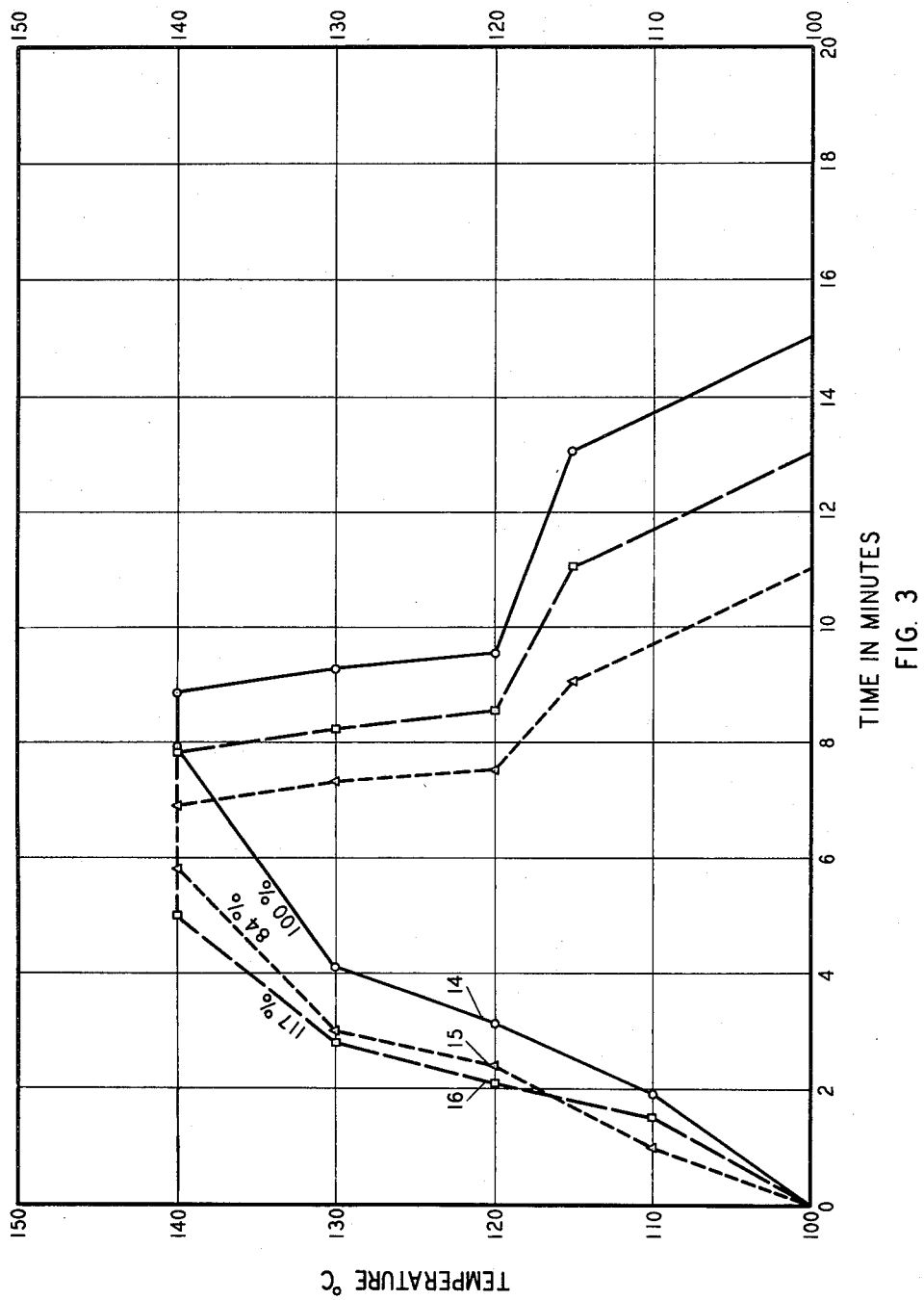
Figure 4:
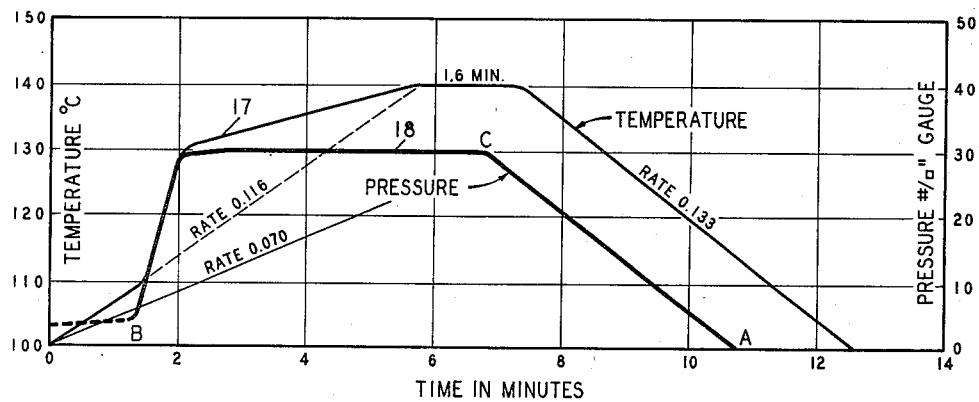
Fig. 4 is a graph presenting the relationship between time, temperature, and heat treatment, particularly as associated with coordinated control apparatus wherein curve 17 is the temperature curve of the material heat treated and curve 18 is the relative pressure curve.

Referring now to Fig. 4 and Fig. 5, a fourth example of processing cottonseed in accordance with the present invention is presented. The cottonseed is charged into autoclave 20 wherein it is heated to approximately 104° C. with an accumulated pressure of approximately 4 lbs. due to moisture content in the cottonseed. This initial temperature is highly desirable to prevent condensation of water on the relatively cool material when steam is admitted. When the cam follower 50 is at A, the exhaust valve 32 is wide open, the cam is stopped, and the 3-way electric air valve 44 is de-energized, thereby exhausting air from the steam valve 24 causing it to close. However, during this initial heating period the cam 46 is rotated, manually, just far enough from point A to cause the exhaust valve 32 to close, thereby building up a pressure as indicated by the dotted portion of the pressure curve 18.

When the initial heating temperature of 104° C. is reached, the cam 48 is manually rotated until the follower 50 reaches point B. This starts the cam 48 mechanically rotating, closes the exhaust valve to withstand the predetermined pressure of 30 lbs., and energizes the 3-way electric air valve 44 which connects the steam valve 24 to the controller 42. The steam valve 24 remains open until the pressure reaches 30 lbs. and the pressure controller 42 thereafter operates the steam valve 24 and relief valve 28 so as to maintain a constant pressure of approximately 30 lbs. within the autoclave 20. When the cam 48 has rotated so that the cam follower 50 is at C, the cam follower 50 starts to drop, which immediately de-energizes the 3-way electric air valve 44 which closes the steam valve 24. The exhaust valve 32 then opens and throttles in a manner which reduces the pressure according to the schedule C to A as cut on the cam 48. When the cam follower 50 reaches point A, the cam 48 stops and a new cycle is ready to be initiated. It is desirable to cut the schedule C to A in such a manner that the rate for cooling of curve 17 remains constant although the material is discharged into subsequent apparatus, such as a cake former, when, for example, the material is still elevated at 110° C. The length of the cooking cycle is represented by temperature curve 17 which is directly related to the pressure curve 18. It can readily be seen that a variation of the distance B to C on cam 48 accordingly alters the temperature curve 17 and provides a means for controlling material being heat treated to a predetermined critical point.

For example, the temperature curve 17 in Fig. 4 illustrates a heat treatment carried out to the extent of 120%. Assuming $\theta_h = 140°$ C.,
$R_r = 0.070°$ C. per second, the weighted rate of temperature rise,
$R_c = 0.133°$ C. per second the rate of temperature fall as cut on the cam, and
$t_h = 1.6$ minutes or 96 seconds, then, according to Equation 28, $$X = 0.0375 \left( \frac{1}{0.070} + \frac{96}{9.1} + \frac{1}{0.133} \right) = 1.2 \text{ or } 120\%$$

Obviously, with the rate of temperature rise and rate of temperature fall for this particular apparatus known, it is a simple matter to control material to any critical point by the method of the invention. For example, if 100% heat treatment were desired, the time at the maximum temperature would be 62 seconds. Since the time at the maximum heating temperature would be approximately 1 minute, to control to this time would merely necessitate reducing the time from B to C on the cam by 0.6 of a minute.

Methods of controlling the rate of temperature rise are also available, for example, if a 100% heat treatment were desired holding $t_h$ and $R_c$ constant as shown on the chart a rate for $R_r = 0.116$ gives 100% heat treatment. To obtain this rate apparatus other than that shown in Fig. 5 is necessary for imparting a variable pressure control to pressure controller 42 all of which is well known.

It is evident that there are numerous factors which will influence conditions for the most satisfactory operation of my invention, the actual limits of which may not be established except by a detailed study of each set of raw materials and the intermediate and finished products involved.

The present invention may be used for the heat treatment of animal or vegetable foodstuff material, including but not limited to meats, seeds, nuts, and cereal grains, particularly for the preparation of such a material as a comestible or for the subsequent separation of constituents therefrom.

Since it is well known that certain foodstuff material may be used without any heat treatment whatever, the general consideration of heat treatment of foodstuff material includes all degrees of such heat treatment up to substantially complete heat treatment. Substantially complete heat treatment as used in connection with my invention is understood to mean heat treatment of such material under conditions such that substantially uniform temperatures are maintained throughout the mass of such material and to a degree just under conditions where any appreciable carbonization of the material takes place. In the process of heat treatment, some foodstuff material requires only a slight heat treatment to prepare them in condition such that they are finally considered to be suitable for use as a comestible whereas, if such material were actually completely heat treated, it would be unsuitable for use as a comestible. In other words, the extent to which heat treatment is required, or the fraction which is desired to be affected, depends upon the material being treated and its use after such treatment.

The heat treatment of animal or vegetable material depends upon the relationship between temperature and time above the temperature at which any substantial effect of such treatment begins or below which it substantially ends. The effect of such relationship upon the foodstuff material being treated may only be determined by the integrated heating action above the temperature at which substantial heat treatment begins. This integrated heating action is equivalent to heating material for a predetermined time at a constant temperature. However, the integrated heat action may be approximated, in many instances, to eliminate complicated mathematical treatment.

The temperature to which a given animal or vegetable material may be heated to obtain substantially complete treatment, as defined above, will depend upon the rate of change in temperature during the rising temperature period above that temperature at which substantial effect begins and other elements, such as the time at which the material is maintained at a substantially maximum heating temperature and the rate of change in temperature during the cooling period to the temperature at which effect of such treatment substantially ends. If it is considered that a small uniform sized particle of material, say a 1 mm. cube, to be substantially completely treated without appreciable carbonization, must be raised above the temperature at which substantial treating effect begins to the maximum temperature for heat treatment in an infinitely short length of time, must be maintained at the temperature for maximum heat treatment for one second and must then be cooled to a temperature below that at which the treating effect substantially ends in an infinitely short length of time, the maximum constant heat treatment temperature is substantially 190° C. Since it is obviously impossible to obtain such a result practically, the effect of heat treatment at lower temperatures is determined by using this maximum constant temperature as a base, taking into account that heat treatment at lower temperatures bears a substantially constant relationship for each 10° C. change in temperature for each material treated. This constant that is the number of times that the rate of conversion increases for each 10° C. change in temperature, is believed to be approximately 3 for foodstuff material generally. It is fully appreciated that due to the complexity of these materials this constant will vary somewhat for each material and for accurate operation this value may require accurate determination for such material. However, since the accurate determination of the extent of conversion in the complex material may not be readily determined, it is believed that the use of constant 3 is satisfactory for most purposes.

It is essential to maintain materials at a substantially uniform temperature throughout the mass of said material during the period of heat treatment. This is particularly true where such heat treatment is to be accomplished in a very short period of time, such as of the order of 5 to 20 minutes. The raw material may be of such size or may be prepared to such size and means provided for handling such unprepared or prepared material during the heat treatment operation so as to maintain a substantially uniform temperature throughout the mass during such treatment.

The material may be given heat treatment in the presence of a fluid suitable for direct contact with such material. Generally such material contains appreciable quantities of water and under the conditions of heat treatment a substantial proportion of this water may be converted into steam. Where it is preferred to use steam as the fluid medium this may be provided in the manner indicated above or from an external source.

The heat treatment to accomplish the degree of conversion required may be carried out at sub-atmospheric, atmospheric or super-atmospheric pressure as required.

It will be seen, therefore, that this invention actually may be carried out by the use of various modifications and changes without departing from its spirit and scope, and with only such limitations placed thereon as are imposed by the prior art.

This application is a continuation-in-part of my application Serial No. 223,042 filed August 4, 1938.

The invention described herein may be manufactured and used by or for the Government for governmental purposes without the payment to me of any royalty thereon.

I claim:

1. A process for the rapid heat treatment of animal or vegetable meaterial in the preparation of said material for use as a foodstuff or the subsequent separation of components or constituents thereof which comprises a. Subjecting said material to the influence of heat with substantially uniform temperatures throughout a mass of said material wherein (1) Said mass of material is heated from approximately 100° C. to a maximum temperature of at least 120° C., and thereafter cooled to approximately 100° C., and (2) The rate of heating, the time at the maximum temperature, the rate of cooling, and the predetermined degree for such heat treatment are so predetermined that the total time required is equivalent to approximately one second at 190° C. for substantially complete heat treatment of said material.

2. The process according to claim 1 wherein a. Said time at the maximum heating temperature is determined substantially according to the equation $$t_h = X\left(3^{\frac{190-\theta_h}{10}}\right) - \left(\frac{9.10241}{R_r} + \frac{9.10241}{R_c}\right)$$

where
$t_h$ is the time in seconds at the maximum heating temperature,
$\theta_h$ is the maximum heating temperature in degrees C.,
$R_r$ is the mean rate of temperature change during the rising temperature period in degrees C. per second,
$R_c$ is the mean rate of temperature change during the cooling period in degrees C. per second, and
$X$ is the total fraction affected.

3. The process according to claim 1 wherein a. Said material is heated to said maximum temperature and thereafter cooled and
b. Said rate of heating is determined substantially according to the equation $$R_r = \frac{1}{X\left(\frac{3^{\frac{190-\theta_h}{10}}}{9.10241}\right) - \frac{1}{R_c}}$$

where
$R_r$ is the mean rate of temperature change during the rising temperature period in degrees C. per second,
$\theta_h$ is the maximum heating temperature in degrees C.,
$R_c$ is the mean rate of temperature change during the cooling period in degrees C. per second, and
$X$ is the total fraction affected.

4. The process according to claim 1 wherein a. Said rate of heating and said rate of cooling are substantially the same, and
b. Said maximum heating temperature is determined substantially according to the equation $$\theta_h = 190 - \left[9.10241 \cdot \log_e\left(\frac{1}{X}\left(\frac{18.20482}{R} + t_h\right)\right)\right]$$

where
$\theta_h$ is the maximum heating temperature in degrees C.,
$R$ is the mean rate of temperature change during the rising temperature period and the cooling period in degrees C. per second,
$t_h$ is the time in seconds at the maximum heating temperature, and
$X$ is the total fraction affected.

5. The process according to claim 1 wherein a. Said material is heated to said maximum temperature and thereafter cooled, b. Said rate of heating and said rate of cooling are substantially the same, and
c. The rate of temperature change during the heating period and the cooling period is determined substantially according to the equation $$R = \frac{18.20482}{X\left(3^{\frac{190-\theta_h}{10}}\right)}$$

where $R$ is the mean rate of temperature change during the rising temperature period and the cooling period in degrees C. per second, $\theta_h$ is the maximum heating temperature in degrees C., and $X$ is the total fraction affected.

ARTHUR L. DAVIS.